US009321178B2

(12) United States Patent
Cho et al.

(10) Patent No.: US 9,321,178 B2
(45) Date of Patent: Apr. 26, 2016

(54) MACHINE SYSTEM INCLUDING WIRELESS SENSOR (71) Applicant: FANUC CORPORATION, Minamitsuru-gun, Yamanashi (JP)

(72) Inventors: Ya Cho, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/629,741

(22) Filed: Feb. 24, 2015

(65) Prior Publication Data
US 2015/0246442 A1 Sep. 3, 2015

(30) Foreign Application Priority Data

Feb. 28, 2014 (JP) .................................. 2014-039448

(51) Int. Cl.
| G06F 17/00 | (2006.01) |
| G06F 19/00 | (2011.01) |
| B25J 9/18 | (2006.01) |
| B25J 9/16 | (2006.01) |
| B25J 19/02 | (2006.01) |
| B25J 13/00 | (2006.01) |
| B25J 13/08 | (2006.01) |

(52) U.S. Cl.
CPC .............. *B25J 9/1679* (2013.01); *B25J 13/006* (2013.01); *B25J 13/088* (2013.01); *B25J 19/02* (2013.01); *B25J 19/021* (2013.01); *Y10S 901/09* (2013.01)

(58) Field of Classification Search
CPC .... B25J 9/1697; B25J 19/0091; B25J 9/1664; B25J 11/005; B25J 13/02; B25J 5/007; B25J 9/16; B62D 57/02; B62D 57/032; G05B 2219/40506; G05B 19/4083; G05B 2219/36503; G05B 2219/37572
USPC .......... 701/2, 26, 54; 700/259, 114, 262, 245, 700/254, 261; 318/568.12, 568.11, 568.2
See application file for complete search history.

(56) References Cited

U.S. PATENT DOCUMENTS

| 4,899,095 A * | 2/1990 | Kishi ..................... B25J 9/1697 318/568.19 |
| 2011/0087360 A1* | 4/2011 | Chen ...................... B25J 9/1697 700/114 |

FOREIGN PATENT DOCUMENTS

| EP | 0067880 | * 7/1982 |
| JP | 05318363 | * 12/1993 |
| JP | H 08-328629 A | 12/1996 |
| JP | 2002-004921 | 1/2002 |
| JP | 2005-316937 A | 11/2005 |
| JP | 2010-190652 A | 9/2010 |
| JP | 2010-284391 A | 12/2010 |
| JP | 2011-161562 | 8/2011 |

* cited by examiner

*Primary Examiner* — Muhammad Shafi
(74) *Attorney, Agent, or Firm* — RatnerPrestia (57) ABSTRACT

A machine system including a sensor unit detecting periodically an acceleration at a tip part of a movable member, a data acquisition unit acquiring first time-series data of the acceleration at the tip part of the movable member corresponding to sensor signal received via a wireless signal path, a data calculation unit configured to calculate second time-series data corresponding to the first time-series data based on a driving command of the motor, a delay time calculation unit calculating a delay time of the first time-series data with respect to the second time-series data according to a degree of correlation between first time-series data and the second time-series data, and a correction unit correcting the first time-series data based on the delay time.

8 Claims, 7 Drawing Sheets

MACHINE SYSTEM INCLUDING WIRELESS SENSOR

BACKGROUND OF INVENTION

1. Field of the Invention

The present invention relates to a machine system including a wireless sensor.

2. Description of the Related Art

In recent years, in a machine tool and an industrial robot, there has been a request for speeding up an operation in order to improve productivity. The speeded-up operation of the machine tool or the robot is accompanied by generation of vibration at a tip part of the machine tool or the robot. Concerning suppression of such vibration, there is known a device configured in such manner that a wireless acceleration sensor is provided at an arm tip part of the robot and vibration at the arm tip part is suppressed based on a sensor signal transmitted from the acceleration sensor by wireless. This device is described in, for example, Japanese Laid-open Patent Publication No. 2011-161562 (JP2011-161562A).

In wireless communication, a signal transmission delay may occur. However, in the device described in JP2011-161562A, no consideration is given to such a wireless transmission delay. Therefore, when a delay occurs in transmission of the sensor signal from the acceleration sensor, it is difficult to accurately suppress the vibration at the arm tip part.

SUMMARY OF THE INVENTION

According to an aspect of the present invention, a machine system includes a machine device including a movable member driven by a motor, a control device configured to control the machine device, a sensor unit provided at a tip part of the movable member and configured to periodically detect a position, a speed or acceleration of the tip part, a wireless signal path through which a sensor signal indicating the position, the speed or the acceleration detected by the sensor unit is transmitted from the machine device to the control device by wireless, a data acquisition unit configured to acquire first time-series data of the position, the speed or the acceleration at the tip part of the movable member corresponding to the sensor signal received via the wireless signal path, a data calculation unit configured to calculate, based on a driving command of the motor, second time-series data of the position, the speed or the acceleration at the tip part of the movable member corresponding to the first time-series data, a delay time calculation unit configured to calculate a delay time of the first time-series data with respect to the second time-series data according to a degree of correlation between first time-series data acquired by the data acquisition unit and the second time-series data calculated by the data calculation unit, and a correction unit configured to correct the first time-series data based on the delay time calculated by the delay time calculation unit.

According to another aspect of the present invention, a machine system includes a machine device including a movable member driven by a motor, a control device configured to control the machine device, a rotational amount detection unit configured to detect a rotational amount of the motor, a sensor unit provided at a tip part of the movable member and configured to periodically detect a position, a speed or acceleration of the tip part, a wireless signal path through which a sensor signal indicating the position, the speed or the acceleration detected by the sensor unit is transmitted from the machine device to the control device by wireless, a data acquisition unit configured to acquire first time-series data of the position, the speed or the acceleration at the tip part of the movable member corresponding to the sensor signal received via the wireless signal path, a data calculation unit configured to calculate, based on a detection value acquired by the rotational amount detection unit, second time-series data of the position, the speed or the acceleration at the tip part of the movable member corresponding to the first time-series data, a delay time calculation unit configured to calculate a delay time of the first time-series data with respect to the second time-series data according to a degree of correlation between first time-series data acquired by the data acquisition unit and the second time-series data calculated by the data calculation unit, and a correction unit configured to correct the first time-series data based on the delay time calculated by the delay time calculation unit.

BRIEF DESCRIPTION OF THE DRAWINGS

The objects, features, and advantages of the present invention will become more apparent from the following detailed description of the exemplary embodiments of the present invention taken in connection with the accompanying drawings, in which.

DETAILED DESCRIPTION

First Embodiment

Figure 1:
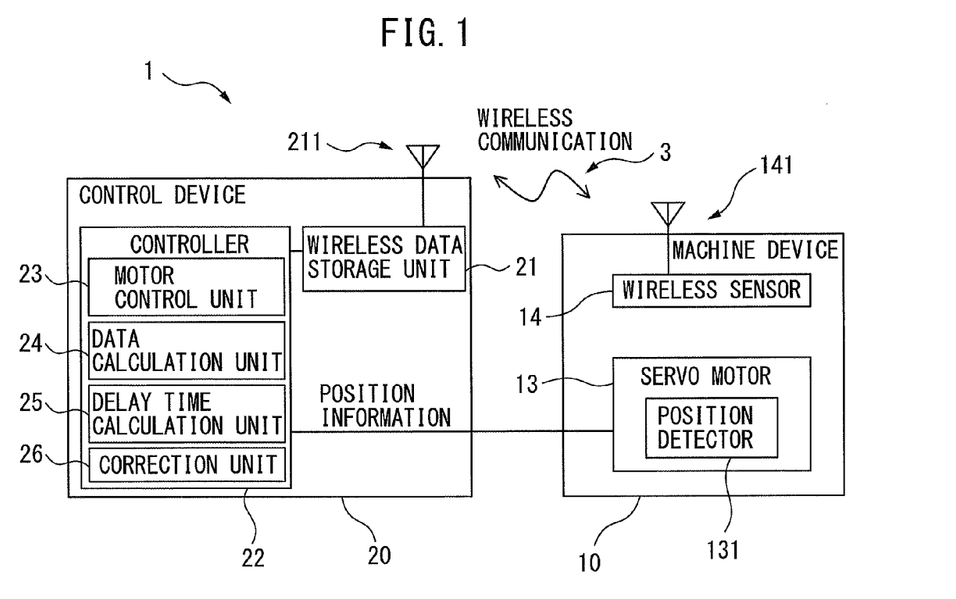
FIG. 1 is a diagram schematically illustrating a configuration of a machine system according to a first embodiment of the present invention.

Hereinafter, a first embodiment of the present invention will be described referring to FIGS. 1 to 6B. FIG. 1 is a diagram schematically illustrating a configuration of a machine system 1 according to the first embodiment of the present invention. As illustrated in FIG. 1, the machine system 1 includes a machine device 10, and a control device 20 configured to control the machine device 10. The machine device 10 may be a machine tool or an industrial robot. Hereinafter, the machine device 10 will be described as an industrial robot.

Figure 2:
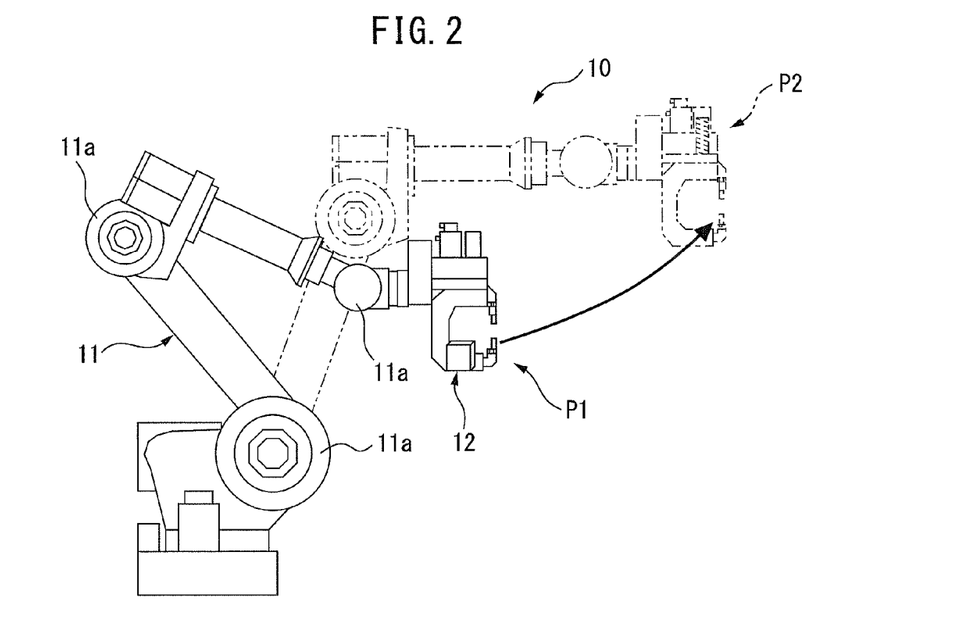
FIG. 2 is a diagram illustrating a configuration of an industrial robot as an example of a machine device to which the present invention is applied.

FIG. 2 is a diagram illustrating a configuration of an articulated industrial robot 10 according to the embodiment of the present invention. As illustrated in FIG. 2, the industrial robot 10 includes a rotatable arm 11. A tool (spot welding gun in FIG. 2) 12 is provided at a tip part of the arm 11. The arm 11 is driven to rotate by a servo motor provided at each joint part 11a (each shaft). In FIG. 2, a state where the tool 12 moves from a first position P1 (solid line) to a second position P2 (broken line) is illustrated.

As illustrated in FIG. 1, the robot 10 includes a servo motor 13 configured to drive the arm 11, and a wireless sensor 14 provided at the tip part of the arm 11. The servo motor (hereinafter, may be also referred to simply as a motor) 13 includes a position detector 131 such as a rotary encoder, and a rotational amount of the motor 13 is detected by the position detector 131. The wireless sensor 14 is an acceleration sensor configured to periodically detect acceleration a1 of the arm tip part, and includes a transmission unit 141 configured to transmit a signal (sensor signal) of the detected acceleration a1 to the control device 20 by wireless.

The control device 20 includes a wireless data storage unit 21 and a controller 22. The wireless data storage unit 21 includes a reception unit 211 configured to receive the sensor signal transmitted from the robot 10. The transmission unit 141 of the robot 10 and the reception unit 211 of the control device 10 constitute a wireless signal path 3. The wireless data storage unit 21 stores data corresponding to the sensor signal received by the reception unit 211, in other words, time-series data (first time-series data) of the acceleration a1 of the arm tip part.

The controller 22 is configured to include an arithmetic processing unit including a central processing unit (CPU), a read-only memory (ROM), a random access memory (RAM), and other peripheral circuits. The controller 22 includes such functional components as a motor control unit 23, a data calculation unit 24, a delay time calculation unit 25, and a correction unit 26.

The motor control unit 23 outputs a control signal (driving command) to the motor 13 according to a preset operation program. At this time, the motor control unit 23 reads a signal from the position detector 131, and executes feedback control for the motor 131 so as to match rotation of the motor 13 with a command value according to the signal from the position detector 131.

The data calculation unit 24 calculates, based on the driving command of the motor 13, time-series data (second time-series data) of acceleration a2 at the arm tip part which is a fitting position of the wireless sensor 14. In this case, the data calculation unit 24 first calculates time-series data of a coordinate position of the arm tip part by sequentially converting command values of the motors 13 of the respective shafts, and then calculates the time-series data of the acceleration a2 by determining the second order differential of the coordinate position data by time.

The delay time calculation unit 25 calculates a correlation value C digitizing a correlation between the first time-series data of the acceleration a1 stored in the wireless data storage unit 21 and the second time-series data of the acceleration a2 calculated by the data calculation unit 24. The delay time calculation unit 25 also calculates delay time ta of the first time-series data with respect to the second time-series data according to the correlation value C. The correlation value C can be calculated by, for example, a least squares method. In other words, a difference between the first time-series data and the second time-series data at the same time point (e.g., difference Δa between characteristics f1 and f2 illustrated in FIG. 4B) is squared, and a sum of squares acquired by adding the squared value for a predetermined time period is set as the correlation value C.

In this case, as the correlation between the first time-series data and the second time-series data is stronger, a calculated value by the least squares method, in other words, the correlation value C, is smaller. Accordingly, sizes of the correlation value C and a preset reference value Ca are determined. When the correlation value C is larger than the reference value Ca, the first time-series data is shifted to an opposite side (arrow direction A illustrated in FIG. 4B) delayed by predetermined time Δt until the correlation value C is equal to or smaller than the reference value Ca. When the correlation value C is equal to or smaller than the reference value Ca, total shifting time ta of the first time-series data is set as delay time. The reference value Ca corresponds to the correlation value C between the first time-series data and the second time-series data when it is assumed, for example, that no delay has been generated in the first time-series data, and can be acquired by experiment or analysis.

The correction unit 26 corrects the first time-series data based on the delay time ta calculated by the delay time calculation unit 25. For example, the correction unit 26 subtracts the delay time ta from a time value of the first time-series data. As a result, the characteristics f1 of the first time-series data shift in the arrow direction A illustrated in FIG. 4B, thereby enabling a time axis of the data acquired by the wireless sensor 14 to be matched with that of the operation command of the robot 1, and the influence of the delay of the data transmitted through the wireless signal path 3 to be eliminated. Therefore, sufficient vibration suppression can be carried out by using the data from the wireless sensor 14 (acceleration sensor).

Figure 3:
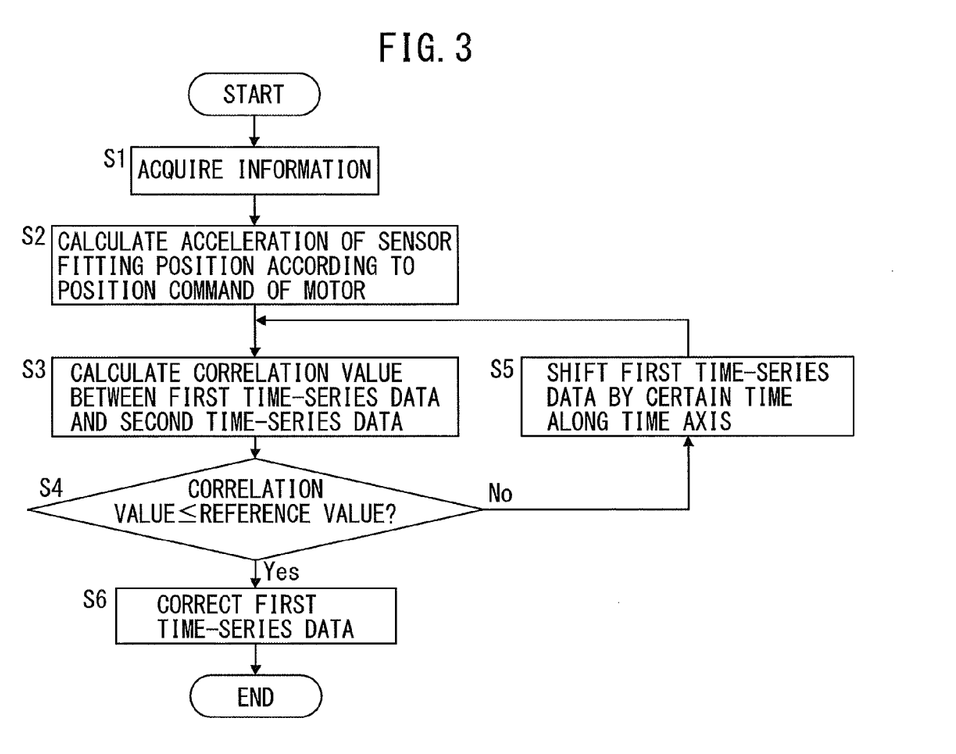
FIG. 3 is a flowchart illustrating an example of processing executed by a controller of the machine system according to the first embodiment of the present invention.
Figure 4A:
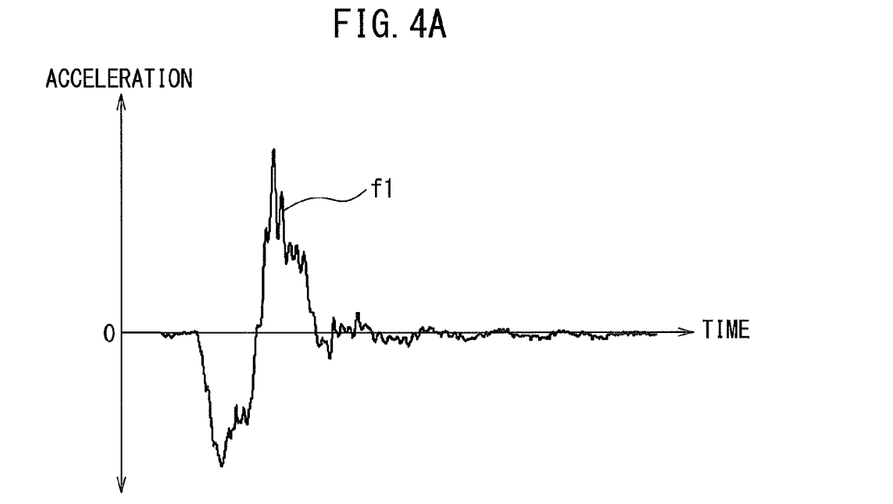
FIG. 4A is a graph illustrating characteristics of first time-series data acquired in step S1 illustrated in FIG. 3.

FIG. 3 is a flowchart illustrating an example of processing executed by the controller 22 of the machine system 1 according to the first embodiment of the present invention. The processing illustrated in the flowchart is started by, for example, turning power ON for the controller 22, and repeatedly executed by a predetermined period. In step S1, the first time-series data of the acceleration a1 stored in the wireless data storage unit 21 and the driving command (motor command value) output from the motor control unit 23 to the motor 13 are read. FIG. 4A is a graph illustrating characteristics f1 of the first time-series data acquired in step S1 when the arm tip part is moved from a first position P1 to a second position P2.

Figure 4B:
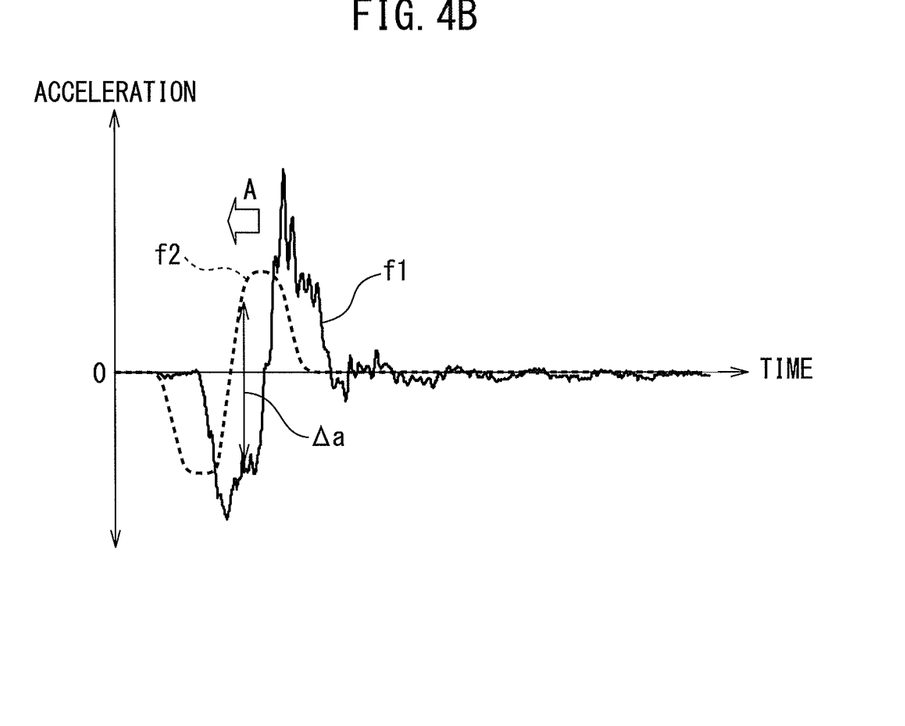
FIG. 4B is a graph illustrating a relationship between the characteristics of the first time-series data acquired in step S1 illustrated in FIG. 3 and characteristics of second time-series data acquired in step S2.

In step S2, by processing at the data calculation unit 24, second time-series data of acceleration a2 at the fitting part of the wireless sensor 4 is calculated based on the motor command value acquired in step S1. FIG. 4B is a graph illustrating a relationship between the characteristics f1 of the first time-series data acquired in step S1 and characteristics f2 of the second time-series data calculated in step S2. The first and second time-series data respectively represent the acceleration a1, a2 at the same position of the arm tip part. As illustrated in FIG. 4B, waveform patterns (peak and trough generation patterns) of the characteristics f1 and f2 are substantially similar to each other. However, the sensor signal transmitted through the wireless signal path 3 has a delay, and the characteristics f1 are shifted to a delay side along a time axis with respect to the characteristics f2.

In step S3, by processing at the delay time calculation unit 25, a correlation value C between the first time-series data acquired in step S1 and the second time-series data calculated in step S2 is calculated. The correlation value C can be calculated by, for example, a least squares method. In step S3, as illustrated in FIG. 4B, a value acquired by squaring a difference Δa between the first time-series data and the second time-series data is added along the time axis to calculate a sum of squares.

In step S4, by processing at the delay time calculation unit 25, whether the correlation value C calculated in step S3 is equal to or smaller than a preset reference value Ca, in other words, whether a degree of correlation between the first time-series data and the second time-series data is equal to or higher than a certain level, is determined. If the negative decision is made in step S4, the processing proceeds to step S5.

In step S5, the time axis of the first time-series data is shifted by predetermined time Δt in the arrow direction A illustrated in FIG. 4B that is a delay opposite side. Then, in step S3, a correlation value C between the first time-series data shifted by the predetermined time Δt and the second time-series data is calculated. The processing of steps S3 to S5 is repeated until the correlation value C is equal to or smaller than the reference value Ca. When the correlation value C is equal to or smaller than the reference value Ca, the positive decision is made in step S4, and the processing proceeds to step S6.

Figure 4C:
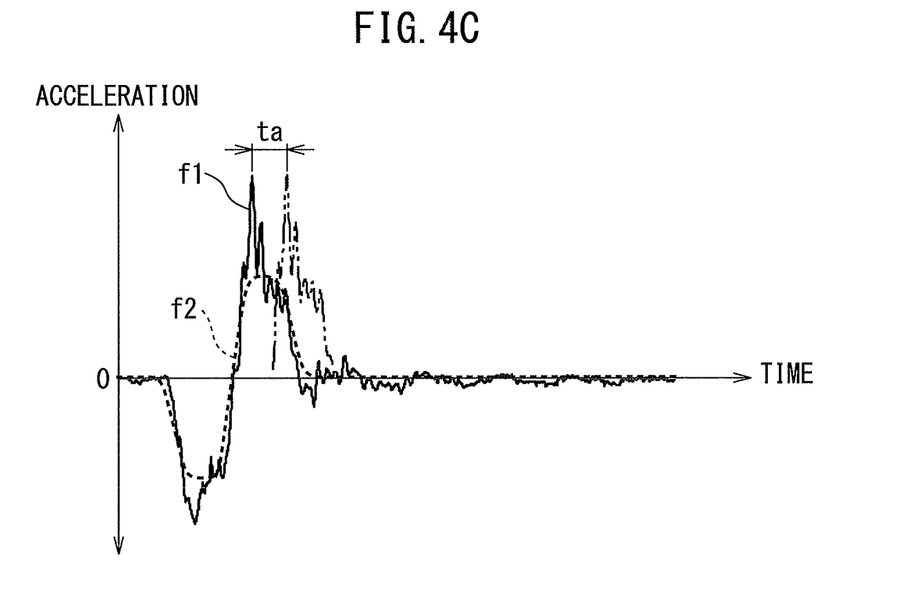
FIG. 4C is a graph illustrating a shifted state of the first time-series data illustrated in FIG. 4B.

FIG. 4C is a graph illustrating a relationship between the characteristics f1 and f2 in a state where the correlation value C is equal to or smaller than the reference value Ca. In FIG. 4C, the first time-series data is shifted to a delay side by a time ta from the state illustrated in FIG. 4A. Accordingly, time axes of waveforms of the characteristics f1 and f2 substantially match each other, and thereby a good correlation is acquired between the first time-series data and the second time-series data. Through the processing of steps S3 to S5, the delay time calculation unit 25 can calculate shifting time (time ta illustrated in FIG. 4C) of the first time-series data until the correlation value C is equal to or smaller than the reference value Ca), i.e., delay time ta.

In step S6, by processing at the correction unit 26, the first time-series data is corrected by using the delay time ta. For example, the delay time ta is subtracted from the time value of the first time-series data, and the subtracted value is used as a correction value of the first time-series data. The vibration suppression control unit (not illustrated) in the controller 22 executes vibration suppression processing by using the correction value. Thus, the data acquired by the wireless sensor 14 corresponds to the operation of the robot 10 without any delay, and vibration suppression control can be performed well.

The first embodiment of the present invention can provide the following operation effects.

(1) The machine system 1 includes the wireless sensor 14 provided at the tip part of the arm 11 and configured to periodically detect the acceleration a1 of the arm tip part, the wireless signal path 3 through which the sensor signal indicating the acceleration a1 detected by the wireless sensor 14 is transmitted from the robot 10 to the control device 20 by wireless, the wireless data storage unit 21 configured to acquire the first time-series data of the acceleration a1 at the arm tip part corresponding to the sensor signal received via the wireless signal path 3, the data calculation unit 24 configured to calculate, based on the driving command of the motor 13, the second time-series data of the acceleration a2 at the arm tip part, the delay time calculation unit 25 configured to calculate the delay time ta of the first time-series data with respect to the second time-series data according to the degree of correlation between the first time-series data acquired by the wireless data storage unit 21 and the second time-series data calculated by the data calculation unit 24, and the correction unit 26 configured to correct the first time-series data based on the calculated delay time ta. Thus, the delay of the sensor signal transmitted via the wireless signal path 3 can be corrected, and vibration suppression control or the like at the arm tip part can be accurately performed.

(2) The delay time calculation unit 25 calculates the correlation value C digitizing the correlation between the first time-series data and the second time-series data, repeats the calculation of the correlation value C while shifting the first time-series data by the predetermined time Δt until the correlation value C is within the reference value Ca (steps S3 to S5), and calculates the shifting time ta from the initial state of the first time-series data when the correlation value C is within the reference value Ca. Thus, by digitizing the correlation between the first time-series data and the second time-series data to determine the size relationship with respect to the reference value Ca, the delay time ta for matching the time axis of the first time-series data with that of the second time-series data can be easily and accurately calculated. The correlation value C can be easily calculated by using the least squares method.

By using a correlation coefficient in place of the least squares method, the correlation value C indicating the degree of correlation between the first time-series data and the second time-series data can be calculated. The correlation coefficient can be acquired within a range of −1 to +1. The correlation coefficient is larger (closer to 1) as the correlation between the first time-series data and the second time-series data is stronger. Accordingly, when the correlation value C is calculated by using the correlation coefficient, a size relationship between the correlation value C and a preset reference value Cb may be determined. Then, when the correlation value C is smaller than the reference value Cb, the first time-series data may be shifted to an opposite side delayed by predetermined time Δt until the correlation value C reaches the reference value Cb or higher, and shifting time of the first time-series data when the correlation value C reaches the reference value Cb or higher may be set as delay time ta. The reference value Cb corresponds to the correlation value C when it is assumed, for example, that no delay has been generated in the first time-series data, and can be acquired by experiment or analysis.

Figure 5:
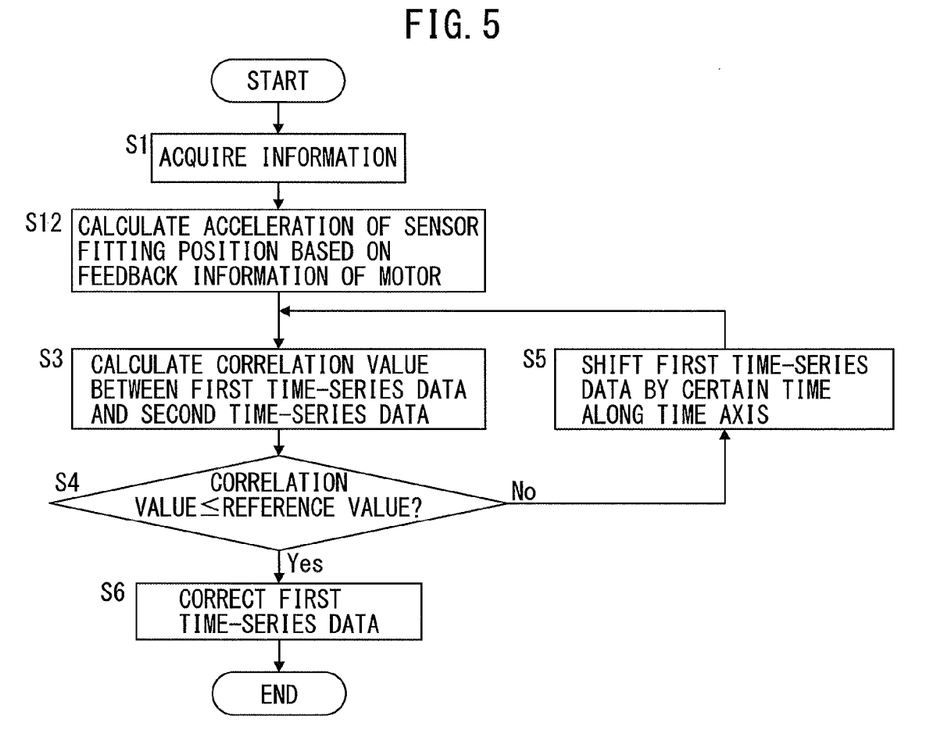
FIG. 5 is a flowchart illustrating a modified example of the processing illustrated in FIG. 3.

According to the first embodiment, the second time-series data is calculated based on the driving command of the motor 13. However, the second time-series data can be calculated based on a signal (feedback signal) from the position detector 131. FIG. 5 is a flowchart illustrating an example of processing executed by the controller 22 in this case. Portions for executing the same processing as that illustrated in FIG. 3 are denoted by the same reference signs.

In step S12 illustrated in FIG. 5, by processing at the data calculation unit 24, second time-series data of acceleration a2 at the fitting part of the wireless sensor 14 is calculated based on feedback information of the motor 13 detected by the position detector 131. Thereafter, delay time ta is calculated by using this second time-series data. Thus, using an actually measured value of a rotational amount of the motor 13 achieves better correspondence between the first time-series data and the second time-series data. As a result, when the first time-series data is shifted by the delay time ta in a delay eliminating direction, the degree of correlation between the first time-series data and the second time-series data is increased, thereby enabling accurate calculation of the delay time ta.

According to the first embodiment, the correlation value C digitizing the correlation between the first time-series data and the second time-series data is calculated, the calculation of the correlation value C is repeated while shifting the first time-series data by the predetermined time Δt until the correlation value C reaches the reference value Ca or Cb, and the shifting time ta of the first time-series data when the correlation value C reaches the reference value Ca or Cb is set as the delay time. In other words, the size relationship between the correlation value C and the reference value Ca or Cb is determined to calculate the delay time ta. However, the delay time ta can be calculated without using the reference value Ca or Cb.

For example, when the correlation value C is calculated by using the least squares method, the calculation of the correlation value C is repeated while shifting the first time-series data by the predetermined time Δt, and shifting time ta of the first time-series data when the correlation value C is smallest may be set as the delay time. On the other hand, when the correlation value C is calculated by using the correlation coefficient, the calculation of the correlation value C is repeated while shifting the first time-series data by the predetermined time Δt, and shifting time ta of the first time-series data when the correlation value C is largest may be set as the delay time.

Thus, the calculation of the correlation value C is repeated while shifting the first time-series data by the predetermined time Δt, and the shifting time ta of the first time-series data when the correlation value C is largest or smallest can be set as the delay time. This arrangement enables elimination of time and labor for setting the reference value Ca or Cb, and more accurate correction of shifting of the time axis of the first time-series data from the second time-series data.

According to the first embodiment, the predetermined time Δt is preferably set not to a fixed value but according to a difference between the correlation value C and the reference value Ca or Cb. For example, as the difference between the correlation value C and the reference value Ca or Cb is larger, the predetermine time Δt is set longer. Thus, when the correlation value C is large, the predetermine time Δt is set long, and calculation time until the correlation value C reaches the reference value Ca or Cb can be shortened.

Figure 6A:
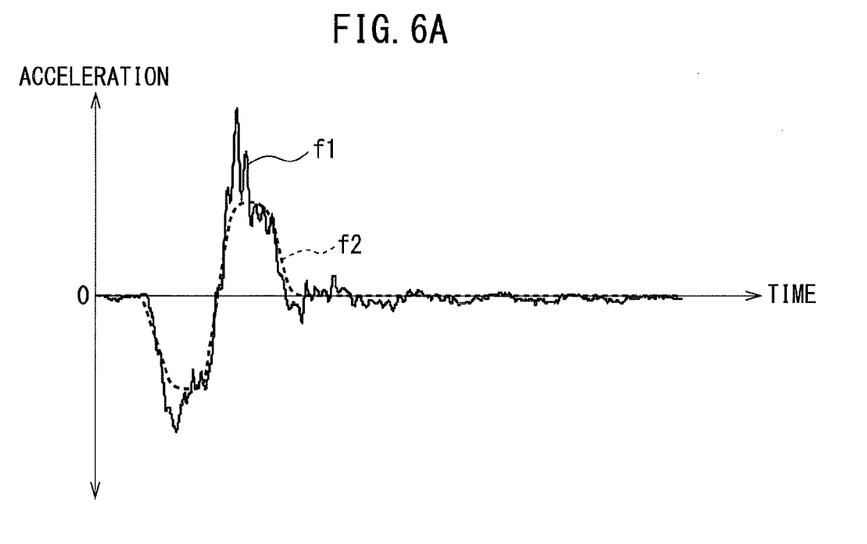
FIG. 6A is a graph illustrating respective characteristics of the first and second time-series data when an operation speed of the robot is fast.
Figure 6B:
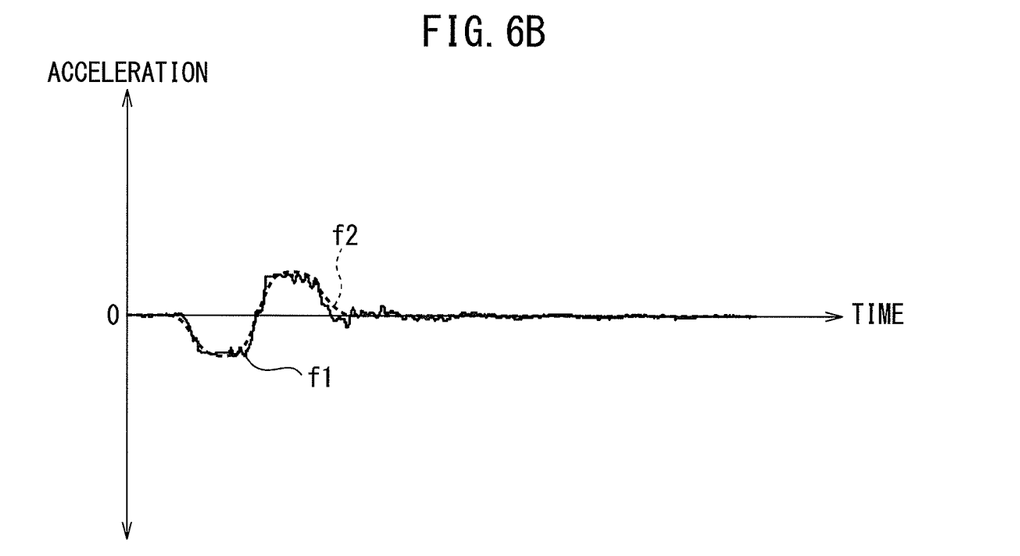
FIG. 6B is a graph illustrating respective characteristics of the first and second time-series data when the operation speed of the robot is slow.

FIG. 6A is a graph illustrating respective characteristics f1 and f2 of the first and second time-series data when an operation speed of the robot 10 is fast. FIG. 6B is a graph illustrating respective characteristics f1 and f2 of the first and second time-series data when the operation speed of the robot is slow. As illustrated in FIG. 6A, when the operation speed is fast, since vibration is larger, the acceleration a1 detected by the wireless sensor 14 is larger. As a result, the first time-series data greatly deviates from the second time-series data. On the other hand, as illustrated in FIG. 6B, when the operation speed is slow, since vibration is smaller, the acceleration a1 detected by the wireless sensor 14 is smaller. As a result, the difference between the first time-series data and the second time-series data is smaller than that illustrated in FIG. 6A.

In view of this point, the reference value Ca or Cb is preferably set according to the acceleration a2 at the arm tip part calculated by the data calculation unit 24. For example, as the acceleration a2 is larger, the reference value Ca or Cb is set larger. Thus, the degree of correlation between the first time-series data and the second time-series data can be determined irrespective of a size of vibration.

Second Embodiment

Figure 8:
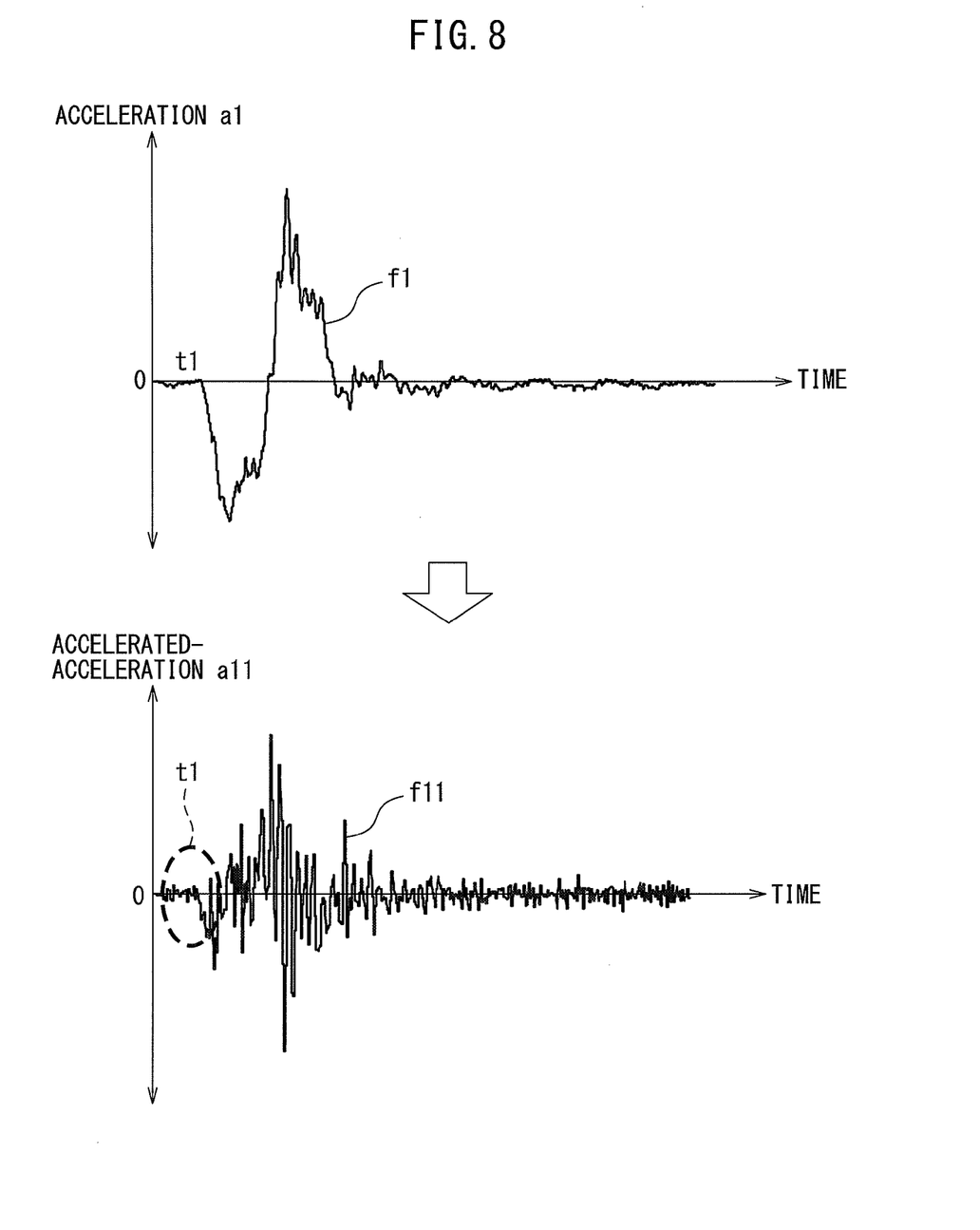
FIG. 8 is a graph illustrating an operation start time point of first time-series data determined in the processing illustrated in FIG. 7.
Figure 9:
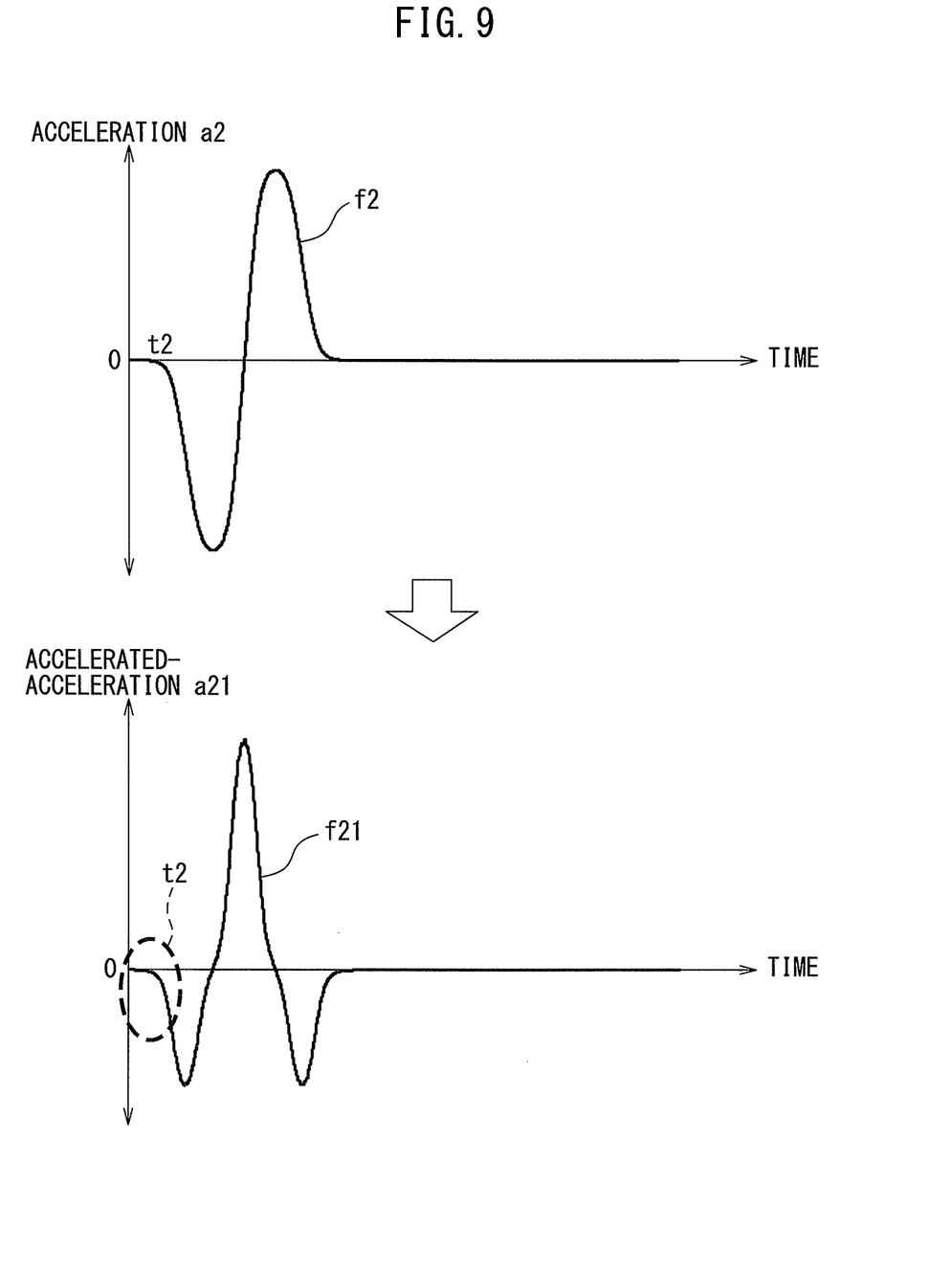
FIG. 9 is a graph illustrating an operation start time point of second time-series data determined in the processing illustrated in FIG. 7.

A second embodiment of the present invention will be described referring to FIGS. 7 to 9. The second embodiment is different from the first embodiment in processing at a delay time calculation unit 25. Specifically, according to the first embodiment, the delay time ta is calculated by shifting the first time-series data by the predetermined time Δt. However, according to the second embodiment, delay time ta is calculated by determining respective operation start time points of first and second time-series data. Hereinafter, mainly differences from the first embodiment will be described.

Figure 7:
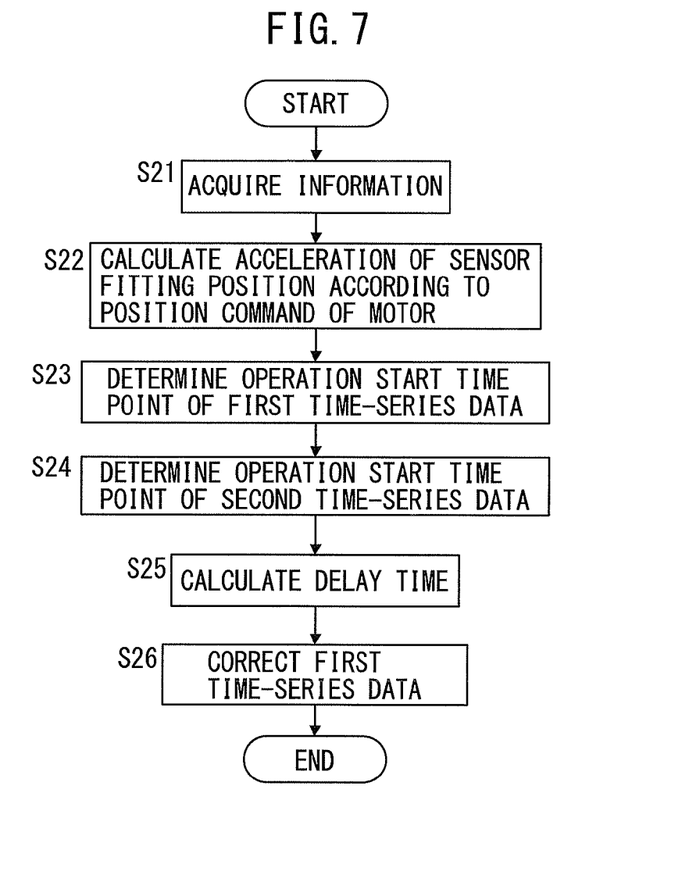
FIG. 7 is a flowchart illustrating an example of processing executed by a controller of a machine system according to a second embodiment of the present invention.

FIG. 7 is a flowchart illustrating an example of processing executed by a controller 22 of a machine system 1 according to the second embodiment of the present invention. In step S21, as in the case of step S1 illustrated in FIG. 3, first time-series data of acceleration a1 stored in a wireless data storage unit 21 and a motor command value output from a motor control unit 23 to a motor 13 are read. In step S22, as in the case of step S2, based on the motor command value acquired in step S21, second time-series data of acceleration a2 at a fitting part of a wireless sensor 14 is calculated.

In step S23, an operation start time point t1 (first operation start time point) of the first time-series data acquired in step S21 is determined. FIG. 8 is a graph illustrating characteristics f1 of the first time-series data and characteristics f11 acquired by differentiating the first time-series data by time. As indicated by the characteristics f1, at the stop time of a robot 10, data of the acceleration a1 detected by the wireless sensor (acceleration sensor) 14 is substantially constant (0). When the robot 10 starts operating at the time point t1, the acceleration data changes. Accordingly, in step S23, the time point (first operation start time point t1) when the acceleration data changes is determined. In this case, in order to facilitate determination of the first operation start time point t1, the delay time determination unit 25 calculates time-series data of accelerated-acceleration a11 acquired by differentiating the acceleration data by time as indicated by the characteristics f11 illustrated in FIG. 8. Then, a time point t1 when changing point of the characteristics f11 occurs, more specifically, a time point when the accelerated-acceleration a11 exceeds a threshold value, is calculated, and this time point t1 is set as a first operation start time point.

In step S24, an operation start time point t2 (second operation start time point) of the second time-series data calculated in step S22 is determined. FIG. 9 is a graph illustrating characteristics f2 of the second time-series data and characteristics f21 acquired by differentiating the second time-series data by time. As indicated by the characteristics f2 illustrated in FIG. 9, at the stop time of the robot 10, data of acceleration a2 calculated based on the motor command value is substantially constant (0). When the robot 10 starts operating at the time point t2, the acceleration data changes. Accordingly, in step S24, the time point (second operation start time point t2) when the acceleration data changes is determined. Also, in this case, as indicated by the characteristics f21 illustrated in FIG. 9, the delay time determination unit 25 calculates time-series data of accelerated-acceleration a21 acquired by differentiating the acceleration data by time. Then, a time point t2 when changing point of the characteristics f21 occurs, more specifically, a time point when the accelerated-acceleration a21 exceeds a threshold value, is calculated, and this time point t2 is set as a second operation start time point.

In step S25, a difference (t1−t2) between the first operation start time point t1 calculated in step S23 and the second operation start time point t2 calculated in step S24 is calculated to be set as delay time ta. In step S26, as in the case of step S6 illustrated in FIG. 3, the first time-series data is corrected by using the delay time ta. In the processing of steps S23 and S24, the first operation start time point t1 and the second operation start time point t2 may be directly determined based on the characteristics f1 and f2 of the acceleration.

Thus, according to the second embodiment, the first operation start time point t1 of the root 10 is calculated based on the first time-series data, the second operation start time point t2 is calculated based on the second time-series data, and the difference (t1−t2) therebetween is set as the delay time ta. As a result, it is not necessary to repeatedly shift the first time-series data along the time axis, and the delay time ta can be calculated within a shorter time than that of the first embodiment.

According to the second embodiment, in view of good correspondence between the first time-series data and the second time-series data except shifting in time axis, the point of correspondence between the first time-series data and the second time-series data, in other words, the difference between the first operation start time point t1 and the second operation start time point t2, is calculated. When the first time-series data is shifted by an amount equivalent to this difference, good correlation is set between the first time-series data and the second time-series data. In other words, the calculation of the difference between the first operation start time point t1 and the second operation start time point t2 corresponds to calculation of delay time ta according to a degree of correlation between the first time-series data and the second time-series data.

According to the second embodiment, the second time-series data is calculated by using the motor command value (step S22). However, as in the case of step S12 illustrated in FIG. 5, the second time-series data may be calculated by a position detector 131. The operation start time points t1 and t2 are points at which the time-series data change (changing points). However, by using other changing points different from the operation start time points and corresponding to each other, delay time of the first time-series data with respect to the second time-series data may be calculated.

According to the embodiment, the wireless sensor 14 is provided at the arm tip part, and the acceleration a1 of the arm tip part is detected by the wireless sensor 14. In other words, the wireless sensor 14 is configured as a wireless acceleration sensor. However, a configuration of the sensor unit is not limited to this. For example, the sensor unit can be configured by using a wireless gyro sensor, a wireless vision sensor, or a wireless inertial sensor.

Rather than detecting the acceleration by the sensor unit, a position or a speed changed following the operation of the robot 10 may be detected. Specifically, a position sensor for detecting a position of the arm tip part or a speed sensor for detecting a speed of the arm tip part can be used as a sensor unit. Accordingly, a wireless data storage unit 21 serving as a data acquisition unit may acquire first time-series data of a position or a speed at the arm tip part corresponding to a sensor signal received via a wireless signal path 3. As long as the sensor signal from the wireless sensor 14 is transmitted to a control device 20 by wireless, a configuration of the wireless signal path 3 is not limited to that described above.

According to the first embodiment, based on the driving command of the motor 13 (FIG. 3), and based on the signal from the position detector 131 serving as the rotational amount detection unit (FIG. 5), the data calculation unit 24 calculates the second time-series data of the acceleration a2. On the other hand, when the wireless sensor 4 detects a position or a speed, the data calculation unit 24 only needs to calculate a position or a speed of the arm tip part. In other words, as long as a position, a speed or acceleration corresponding to the first time-series data is calculated, a configuration of the data calculation unit 24 is not limited to that described above. For example, in the first embodiment, the reference value Ca or Cb may be set not according to the acceleration a2 but according to the speed. In other words, as the speed is faster, the reference value Ca or Cb may be set larger. When the second time-series data corresponding to the first time-series data is position data, the data calculation unit 24 may calculate speed data by differentiating the position data by time, and set the reference value Ca or Cb according to the speed data.

The delay time ta is calculated by using the correlation value C according to the first embodiment, while the delay time ta is calculated by using the operation start time points t1 and t2 according to the second embodiment. However, any configuration may be employed for the delay time calculation unit 25 as long as the delay time of the first time-series data with respect to the second time-series data is calculated according to the degree of correlation between the first time-series data and the second time-series data.

In the above embodiment, the machine device 10 is described as the industrial robot. However, the present invention can be similarly applied to other machine devices such as a machine tool. Thus, the movable member driven by the motor is not limited to the arm 11.

One or a plurality of modified examples of the embodiment can be arbitrarily combined.

According to the present invention, the delay time of the first time-series data with respect to the second time-series data is calculated according to the degree of correlation between the first time-series data corresponding to the sensor signal transmitted via the wireless signal path and the second time-series data calculated based on the motor driving command or the motor rotational amount, and the first time-series data is corrected by using the delay time. As a result, the delay of the sensor signal can be corrected, and vibration suppression control or the like of the machine can be accurately carried out.

While the preferred embodiments of the present have been described, as obvious to those skilled in the art, various modifications and changes can be made without departing from the scope of the appended claims.

The invention claimed is:
1. A machine system comprising:
   a machine device including a movable member driven by a motor;
   a control device configured to control the machine device;
   a sensor unit provided at a tip part of the movable member and configured to periodically detect a position, a speed or acceleration of the tip part;
   a wireless signal path through which a sensor signal indicating the position, the speed or the acceleration detected by the sensor unit is transmitted from the machine device to the control device by wireless;
   a data acquisition unit configured to acquire first time-series data of the position, the speed or the acceleration at the tip part of the movable member corresponding to the sensor signal received via the wireless signal path;
   a data calculation unit configured to calculate, based on a driving command of the motor, second time-series data of the position, the speed or the acceleration at the tip part of the movable member corresponding to the first time-series data;

a delay time calculation unit configured to calculate a delay time of the first time-series data with respect to the second time-series data according to a degree of correlation between first time-series data acquired by the data acquisition unit and the second time-series data calculated by the data calculation unit; and a correction unit configured to correct the first time-series data based on the delay time calculated by the delay time calculation unit.

2. The machine system according to claim 1, wherein the delay time calculation unit calculates a correlation value digitizing a correlation between the first time-series data and the second time-series data, repeats calculation of the correlation value while shifting the first time-series data by a predetermined time until the correlation value reaches a reference value, and sets shifting time of the first time-series data when the correlation value reaches the reference value as the delay time.

3. The machine system according to claim 2, wherein the predetermined time is set according to a difference between the correlation value and the reference value.

4. The machine system according to claim 2, wherein, the data calculation unit further calculates a position or acceleration at the tip part of the movable member when the second time-series data is position data, and the reference value is set according to the position or the acceleration at the tip part of the movable member calculated by the data calculation unit.

5. The machine system according to claim 1, wherein the delay time calculation unit calculates a correlation value digitizing a correlation between the first time-series data and the second time-series data, repeats calculation of the correlation value while shifting the first time-series data by a predetermined time, and sets shifting time of the first time-series data when the correlation value is largest or smallest as the delay time.

6. The machine system according to claim 1, wherein the delay time calculation unit determines a first operation start time point of the machine device based on the first time-series data acquired by the data acquisition unit, determines a second operation start time point of the machine device based on the second time-series data calculated by the data calculation unit, and calculates the delay time according to a difference between the first operation start time point and the second operation start time point.

7. The machine system according to claim 1, wherein the sensor unit includes at least one of a wireless gyro sensor, a wireless acceleration sensor, a wireless vision sensor, and a wireless inertial sensor.

8. A machine system comprising:

a machine device including a movable member driven by a motor;

a control device configured to control the machine device;

a rotational amount detection unit configured to detect a rotational amount of the motor;

a sensor unit provided at a tip part of the movable member and configured to periodically detect a position, a speed or acceleration of the tip part;

a wireless signal path through which a sensor signal indicating the position, the speed or the acceleration detected by the sensor unit is transmitted from the machine device to the control device by wireless;

a data acquisition unit configured to acquire first time-series data of the position, the speed or the acceleration at the tip part of the movable member corresponding to the sensor signal received via the wireless signal path;

a data calculation unit configured to calculate, based on a detection value acquired by the rotational amount detection unit, second time-series data of the position, the speed or the acceleration at the tip part of the movable member corresponding to the first time-series data;

a delay time calculation unit configured to calculate a delay time of the first time-series data with respect to the second time-series data according to a degree of correlation between first time-series data acquired by the data acquisition unit and the second time-series data calculated by the data calculation unit; and a correction unit configured to correct the first time-series data based on the delay time calculated by the delay time calculation unit.

\* \* \* \* \*